(No Model.)
C. V. WOERD.
APPARATUS FOR GRINDING LATHE CUTTERS.
No. 271,966. Patented Feb. 6, 1883.
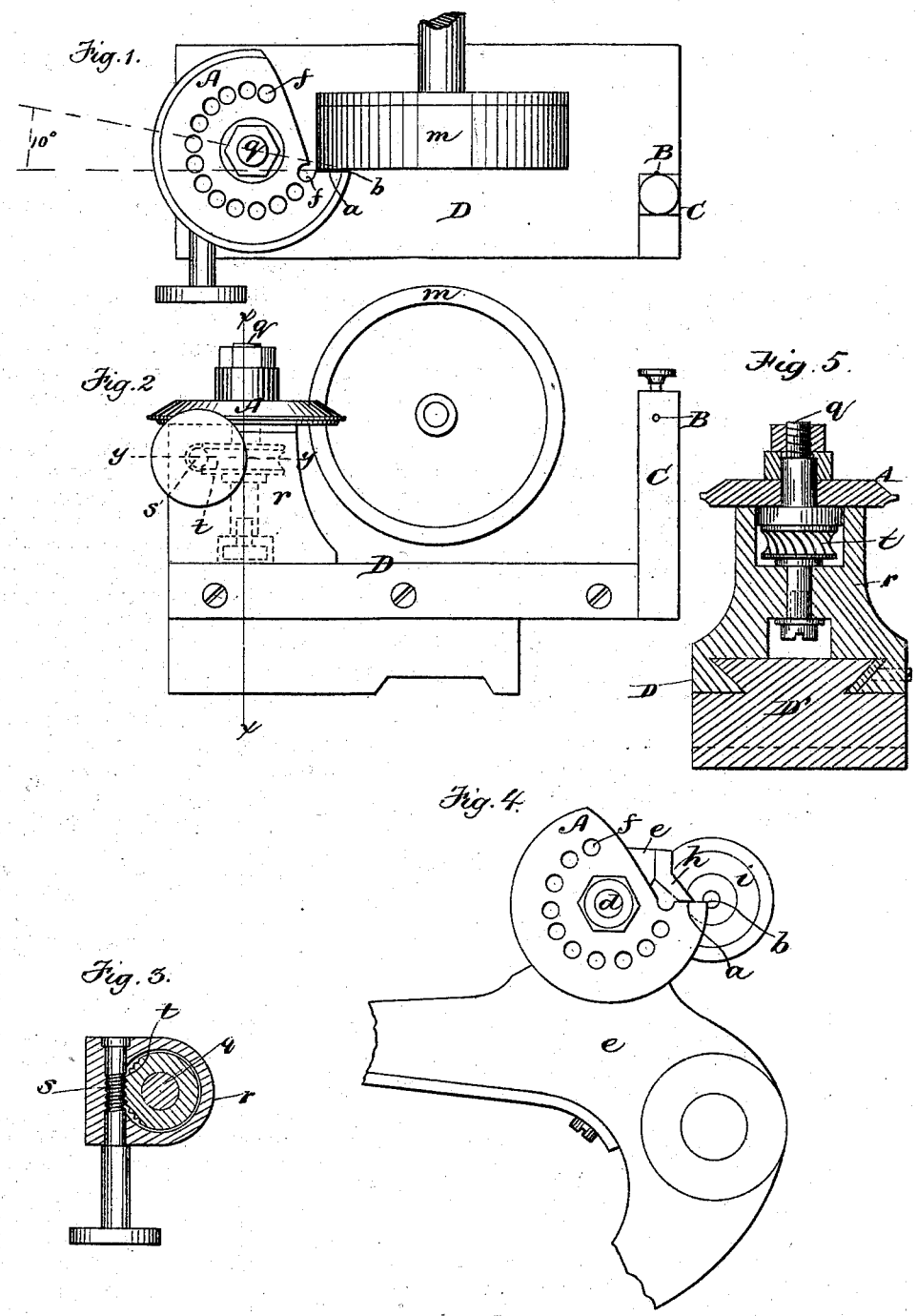

UNITED STATES PATENT OFFICE.

CHARLES V. WOERD, OF WALTHAM, MASSACHUSETTS.

APPARATUS FOR GRINDING LATHE-CUTTERS.

SPECIFICATION forming part of Letters Patent No. 271,966, dated February 6, 1883.

Application filed March 24, 1882. (No model.)

*To all whom it may concern:*

Be it known that I, CHARLES V. WOERD, of Waltham, in the county of Middlesex and State of Massachusetts, have invented certain Improvements in Apparatus for Grinding Lathe-Cutters, of which the following is a specification.

This invention relates to means for grinding the improved lathe-cutter shown in my pending application for Letters Patent of the United States, No. 50,070, filed January 13, 1882; and it consists in the improved apparatus for grinding, which I will now proceed to describe and claim.

Of the accompanying drawings, forming a part of this specification, Figure 1 represents a top view of the devices employed in carrying out my invention. Fig. 2 represents an end view of the same. Fig. 3 represents a section on line $y\ y$, Fig. 2. Fig. 4 represents the cutter above referred to and the means for holding the same in operative position. Fig. 5 represents a vertical section on line $x\ x$, Fig. 1.

The same letters of reference indicate the same parts in all the figures.

In the drawings, A represents the cutter forming the subject-matter of my former application above referred to, said cutter being composed of a circular plate or disk, cut away or notched at one side, as shown in Fig. 1, one side, $a$, of the notch forming a sufficient angle with the perimeter of the plate to constitute a cutting-edge, $b$, said angle being preferably acute.

At the center of the plate A is an orifice, which is concentric with the perimeter, and receives the supporting pin or stud $d$, which is attached to a support, $e$, when in use in a lathe.

$f\ f\ f$ represent a concentric series of holes in the plate A, said holes being equidistant from the center of the plate, and at such a distance from the margin thereof that the first hole in the series is merged or opens into the apex of the notch of the plate.

$h$ represents a fixed finger or stop attached to the support $e$, and adapted to bear upon the side $a$ of the notch in the plate A and limit the rotation of the plate on its pin $d$. The location of the stop $h$ is such that it will arrest the plate when its cutting edge or angle is in its proper position relatively to the work presented to it by the chuck $i$. (See Fig. 4.)

Each hole $f$ in succession forms a recess behind the inner end of the surface $a$ of the notch of the plate A as said plate is worn away by grinding.

In carrying out my invention the grinding of the plate to keep its cutting edge or angle in operative condition is performed by a lap or grinding wheel, $m$, (see Figs. 1 and 2,) which is a hollow cylinder of emery or other abrasive material, the rim of the cylinder being about equal in thickness to one-half of the length of the surface $a$ of the notch in the plate A. The surface $a$ is presented to the end of the lap or cylinder $m$, as shown in Figs. 1 and 2, and the hole $f$ at the inner end of said surface receives the angle at the outer margin of the acting end or surface of the lap, as shown in Fig. 1, and prevents said angle from being worn away or rounded off, as it would be if the holes $f$ were not provided. The operating-face of the lap is thus kept perfectly flat and true. When the surface $a$ is cut away by grinding, so that it nearly reaches the thin wall between the hole $f$ behind said surface and the next hole, said wall should be cut away, so that it will not obstruct the action of the lap.

The plate A is held while being presented to the lap by a spindle or holder, $q$, which is journaled in a fixed upright, $r$, on the slide D, and is adapted to be rotated by a worm-gear, $s\ t$. The spindle $q$ passes through and fits closely in the central orifice, $c$, of the plate A, and the plate is secured firmly to the spindle by a clamping-nut, as shown in Fig. 5. The slide D is movable upon its guides $D'$ in a direction at right angles with the axis of the lap, and the lap is adjustable in a direction at right angles to the movement of the slide, to enable the wear of its operating face or end to be compensated for.

C represents a standard rigidly affixed to the slide D and supporting a diamond, B, or other pointed body of suitable hardness—such as iridium—which projects from one side of the standard, as shown in Fig. 1. The point of the diamond occupies a fixed relation to the center or axial line of the spindle $q$, and its function is to govern the forward movement of the lap when the latter is adjusted, the slide D being moved so as to bring the diamond opposite the end of the lap, and the latter being then adjusted so that its operating-face will touch the diamond. The plate A is then affixed to the spindle $q$ and the slide is moved back so as to present the surface $a$ of the plate to the lap, said surface being then ground until a sharp angle, $b$, is formed and the entire surface is parallel with the operating-face of the lap, the surface $a$ being pressed against the lap during the operation by sufficiently rotating the spindle $q$. It will be seen, therefore, that the angle of the surface $a$ with relation to the center and perimeter of the plate A is determined by the relative positions of the diamond and the spindle $q$, so that the operator, by adjusting the lap to the diamond, as described, cannot fail to grind the surface $a$ at the desired angle and obtain the desired acuteness of cutting edge or angle $b$. Entire accuracy of grinding is thus secured without the necessity of employing skilled labor, it being impossible to grind the surface $a$ at any other than the predetermined angle, said angle being maintained until the plate is worn out. This provision for accuracy of grinding, in connection with the fixed stop $h$, which bears against the surface $a$ when the cutter is in use, makes it absolutely certain that the cutting-edge $b$ will always occupy the proper position relatively to the work. Entire accuracy and uniformity in the work performed by the cutter are thus insured.

The spindle $q$ is preferably so located on the slide that when the lap has been adjusted to the diamond and the slide has been moved to present the plate A to the lap a line drawn from the part of the operating-face of the lap that coincides with the point or angle $b$ of the plate through the center of the spindle will form an angle of about ten degrees with the plane of the operating-face of the lap, as shown in Fig. 1. The hardness of the diamond prevents it from being worn away by contact with the lap, so as to vary the desired relation of the point of the diamond with the spindle $q$.

I claim—

1. The combination of the herein-described lap or grinding wheel with the stud or spindle for carrying the notched cutter, adapted to be rotated to bring said cutter into contact with said grinding-wheel, and a stud occupying a fixed relation to the said cutter-bearing spindle and carrying a testing-point, whereby the operator is enabled to determine the relative position of the cutter and grinding-wheel, substantially as shown and set forth.

2. The combination, with the lap or grinding wheel, of the cutter-holder and testing-point B, having a fixed relation to each other, and both supported upon a slide which is movable at right angles to the axis of the lap, whereby the cutter and point may be alternately presented to the lap, as set forth.

In testimony whereof I have signed my name to this specification, in the presence of two subscribing witnesses, this 20th day of March, 1882.

CHAS. V. WOERD.

Witnesses:
G. H. SHIRLEY,
C. F. BROWN.